United States Patent
Hodge

(10) Patent No.: US 11,023,987 B2
(45) Date of Patent: Jun. 1, 2021

(54) SYSTEMS AND METHODS FOR LOCATION FENCING WITHIN A CONTROLLED ENVIRONMENT

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 16/530,527

(22) Filed: Aug. 2, 2019

(65) Prior Publication Data

US 2020/0160470 A1    May 21, 2020

Related U.S. Application Data

(63) Continuation of application No. 16/025,808, filed on Jul. 2, 2018, now Pat. No. 10,373,280, which is a
(Continued)

(51) Int. Cl.

| | |
|---|---|
| *G06Q 50/26* | (2012.01) |
| *H04W 4/02* | (2018.01) |
| *H04W 4/30* | (2018.01) |
| *H04W 4/021* | (2018.01) |
| *H04W 4/029* | (2018.01) |

(Continued)

(52) U.S. Cl.
CPC ........... *G06Q 50/26* (2013.01); *H04L 67/306* (2013.01); *H04W 4/02* (2013.01); *H04W 4/023* (2013.01); *H04W 4/30* (2018.02); *H04W 4/021* (2013.01); *H04W 4/029* (2018.02); *H04W 4/80* (2018.02)

(58) Field of Classification Search
CPC .......... G06Q 50/26; H04W 4/30; H04W 4/02; H04W 4/023; H04W 4/029; H04W 4/80; H04W 4/021; H04L 67/306
See application file for complete search history.

(56) References Cited

U.S. PATENT DOCUMENTS

| | | |
|---|---|---|
| 9,826,344 B2 | 11/2017 | Sennett |
| 10,019,769 B1 | 7/2018 | Hodge |
| (Continued) | | |

OTHER PUBLICATIONS

International Search Report and Written Opinion of the International Searching Authority directed to related International Patent Application No. PCT/US2018/042501, dated Sep. 27, 2018; 6 pages.

*Primary Examiner* — Charles N Appiah
*Assistant Examiner* — Frank E Donado
(74) *Attorney, Agent, or Firm* — Sterne, Kessler, Goldstein & Fox P.L.L.C.

(57) ABSTRACT

Methods and systems for providing location fencing within a controlled environment are disclosed herein. A location fencing server determines a location of a first inmate based on a first beacon device, and determines a location of a second inmate based on a second beacon device. Further, the location fencing server determines a proximity status based on the location of the first inmate and the location of the second inmate. Additionally, the location fencing server determines that the first inmate and the second inmate are in violation of a proximity policy based on the proximity status. In some embodiments, the location fencing server sends a notification to an employee device based on the violation of a proximity policy.

17 Claims, 8 Drawing Sheets

Related U.S. Application Data continuation of application No. 15/651,936, filed on Jul. 17, 2017, now Pat. No. 10,019,769.

(51) Int. Cl.
*H04L 29/08* (2006.01)
*H04W 4/80* (2018.01)

(56) References Cited

U.S. PATENT DOCUMENTS

| | | |
|---|---|---|
| 2006/0267833 A1* | 11/2006 | Langford .............. G01S 5/0252 342/174 |
| 2013/0293378 A1 | 11/2013 | Aninye |
| 2014/0334610 A1 | 11/2014 | Hangsleben |
| 2015/0269366 A1 | 9/2015 | Bells |
| 2015/0269386 A1 | 9/2015 | Khetawat |
| 2016/0057023 A1 | 2/2016 | Gupta |
| 2016/0110987 A1 | 4/2016 | Hughes |
| 2016/0132670 A1 | 5/2016 | Salama |
| 2016/0157074 A1 | 6/2016 | Joao |
| 2017/0140625 A1* | 5/2017 | Hoyt .................. G08B 21/0269 |
| 2017/0162031 A1 | 6/2017 | Drolshagen |
| 2017/0336967 A1* | 11/2017 | Grothe ................ G06F 3/04883 |
| 2018/0139589 A1 | 5/2018 | Hangsleben |
| 2019/0066247 A1 | 2/2019 | Hodge |

* cited by examiner

SYSTEMS AND METHODS FOR LOCATION FENCING WITHIN A CONTROLLED ENVIRONMENT

CROSS-REFERENCE TO RELATED APPLICATIONS

This application is a Continuation of U.S. application Ser. No. 16/025,808, filed Jul. 2, 2018, which is a Continuation of U.S. application Ser. No. 15/651,936, filed Jul. 17, 2017, now U.S. Pat. No. 10,019,769, both of which are incorporated herein by reference in their entirety.

FIELD OF THE INVENTION

This disclosure relates to systems and methods for providing location fencing within a controlled environment.

BACKGROUND OF THE INVENTION

In a controlled environment, such as a correctional facility or prison, administrators seek to prevent verbal and/or physical confrontations between inmates. Further, jurisdictional entities may require that specific inmates remain separated in accordance with a judicial order for fear of physical confrontation. However, existing technologies do not provide employees of a controlled environment an opportunity to prevent verbal and/or physical confrontations far in advance of inmate and/or employee safety being been put at risk.

BRIEF DESCRIPTION OF THE DRAWINGS/FIGURES

A further understanding of the invention can be obtained by reference to a preferred embodiment set forth in the illustrations of the accompanying drawings. Although the illustrated embodiment is merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE INVENTION

As required, a detailed illustrative embodiment of the invention is disclosed herein. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. The following presents a detailed description of the preferred embodiment of the invention.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Figure 1:
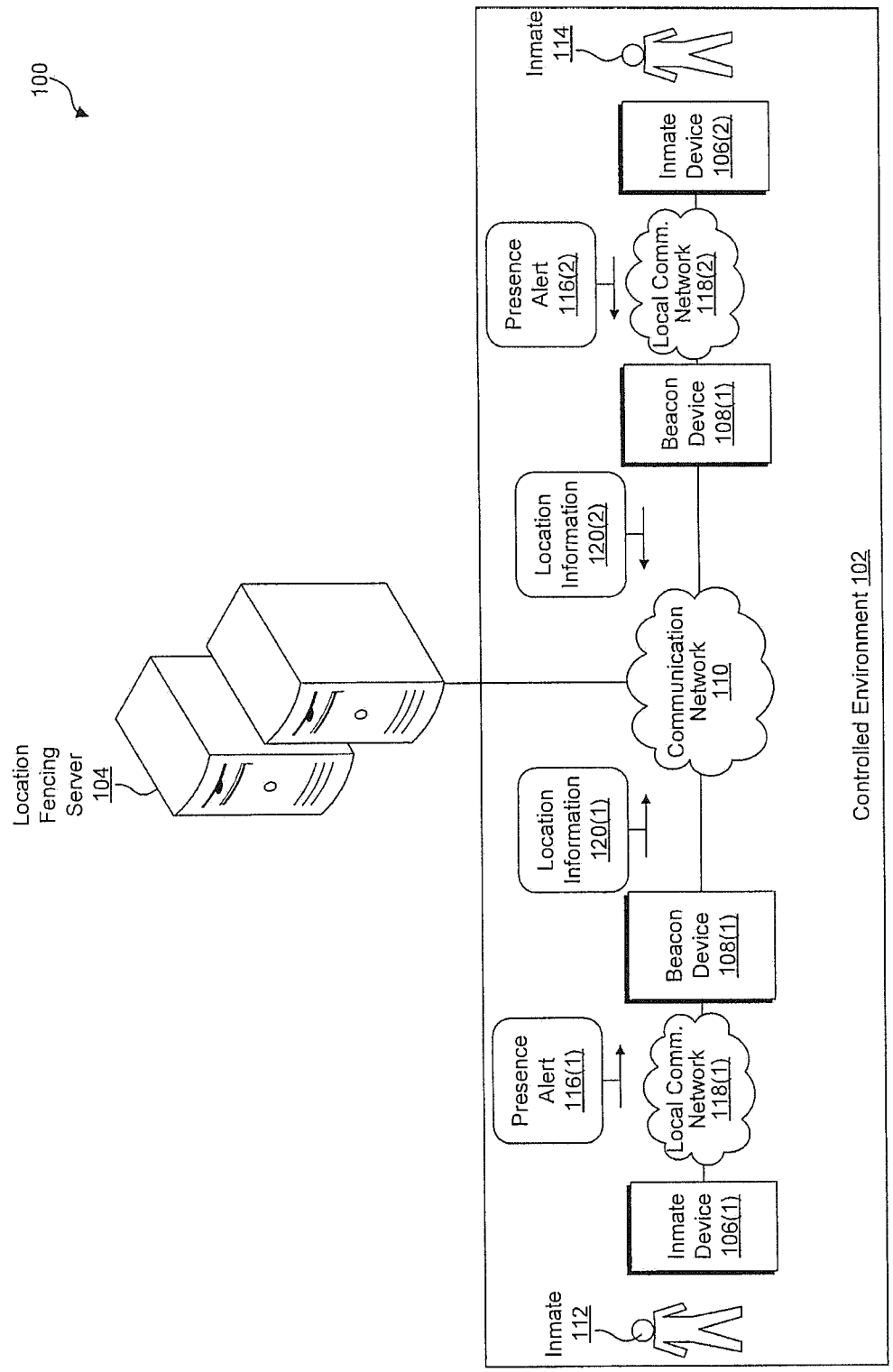
FIG. 1 illustrates a block diagram of an example framework for providing a location fencing system in a controlled environment, according to exemplary embodiments.

FIG. 1 illustrates a block diagram of an example framework for providing a location fencing system 100 in a controlled environment 102 (e.g., correctional facility, detention center, hospital, dormitory, mental health institution, etc.), according to an exemplary embodiment. In some embodiments, the controlled environment 102 is arranged into areas, stations, or regions associated with various functions (e.g., cell block, dining hall, commissary, library, exercise yard, hallway(s), etc.). FIG. 1 shows interactions between a location fencing server 104, inmate devices 106 (i.e., the first inmate device 106(1) and the second inmate device 106(2)), and beacon devices 108 (i.e., the first beacon device 108(1) and the second beacon device 108(2)) via a communication network(s) 110. The communication network 110 may include any or all of a private network, personal area network (PAN), Local-Area Network (LAN), a Wide-Area Network (WAN), or the Internet. Further, the connection between any of the location fencing server 104, the inmate devices 106, or the beacon devices 108, and the communication network(s) 110 may be a wireless connection (e.g., Bluetooth™, Wi-Fi connection, etc.), or a wired connection (e.g., Ethernet, universal serial bus (USB), etc.).

As illustrated in FIG. 1, the first inmate device 106(1) is associated with a first inmate 112, and the second inmate device 106(2) is associated with a second inmate 114. Further, the first inmate 112 and the second inmate 114 may be confined to the controlled environment 102. For example, the first inmate 112 may be imprisoned within the controlled environment 102 in accordance with a prison sentence. In some embodiments, the inmate devices 106 are provided to the first inmate 112 and the second inmate 114, respectively, for entertainment, monitoring, and/or medical purposes within the controlled environment 102.

Some examples of the inmate devices 106, include smart phones and mobile communication devices, tablet computing devices, desktops, laptops, netbooks and other portable computers, wearable computing devices, and any other computing device capable of communicating with the beacon device 108(1) and/or the beacon device 108(2). Some other examples of the inmate devices 106 include tracking devices, such as fitted transponders, ankle bracelets, wrist bracelets, and other tracking devices insertable into the human body. Further, the inmate devices 106 may include tamper proof and/or tamper detecting components.

In some embodiments, the beacon device 108(1) and the beacon device 108(2) are associated with the same area within the controlled environment 102. In some other embodiments, the beacon device 108(1) and the beacon device 108(2) are associated with separate areas within the controlled environment 102. In addition, when the inmate devices 106 are within proximity of the beacon devices 108, the beacon devices 108 communicate with the inmate devices 106. For example, the first inmate device 106(1) sends a presence alert 116(1) to the first beacon device 108(1) via a first local communication network 118(1). In certain embodiments, the first local communication network 118(1) provides communication by way of one or more of a wireless local area network (WLAN) standard, a near field communication (NFC) standard, a radio frequency identification (RFID) standard, infrared (IR) standard, Bluetooth, ZigBee, or Z-wave standard.

Upon receipt of the first presence alert 116(1), the first beacon device 108(1) sends first location information 120(1) to the location fencing server 104 via the communication network 110. In some embodiments, the location information 120(1) includes at least one of an identifier of the first beacon device 108(1), an identifier of a location of the first beacon device 108(1) within the controlled environment 102, an identifier of a location of the first inmate device 106(1) within the controlled environment 102, an identifier of the first inmate device 106(1) and/or the first inmate 112, or a timestamp indicating the date and time of an interaction between the first beacon device 108(1) and the first inmate device 106(1). In some embodiments, an identifier of a location includes global positioning system (GPS) data, indoor positioning system (IPS) data, globenaya navigatsionnaya sputnikovaya sistema (GLONASS) data, etc.

In addition, the second beacon device 108(2) detects the presence of the second inmate device 106(2). For instance, the second inmate device 106(2) sends a second presence alert 116(2) to the second beacon device 108(2). Further, the second beacon device 108(2) sends second location information 120(2) to the location fencing server 104 via the communication network 110 in response to detecting the presence of the second inmate device 106(2)

Upon receipt of location information 120, the location fencing server 104 determines whether the first inmate 112 is present within a permissible geographic boundary. In some embodiments, the location fencing server 104 determines that the first inmate 112 is currently located in a restricted area, and thus outside of the permissible geographic boundary as set forth in a location policy. In certain embodiments, the location fencing server 104 determines that the first inmate 112 has vacated an assigned geographic area, and thus is outside of the permissible geographic boundary as set forth in a location policy. In some other embodiments, the location fencing server 104 determines that the first inmate 112 and the second inmate 114 are in violation of a proximity policy that forbids them from being within a predetermined distance of each other. In yet still some other embodiments, the location fencing server 104 determines a predicted path of the first inmate 112 and/or the second inmate 114. Further, the location fencing server 104 determines that the predicted path leads the first inmate 112 to an impermissible area of the controlled environment 102.

In some embodiments, the location fencing server 104 employs machine learning techniques to determine predicted paths of the first inmate 112 and the second inmate 114. For example, the location fencing server builds a prediction model that determines a predicted path of the first inmate 112 based at least in part on a daily schedule of the first inmate 112, a daily schedule of other inmates related to the first inmate 112, historic location information associated with the first inmate 112, historic location information associated with other inmates related to the first inmate 112, one or more events occurring within the controlled environment 102, historic attendance by the first inmate 112 of events within the controlled environment, one or more interests of the first inmate 112, weather information, hour of the day, day of the week, month of the year, medical information associated with the first inmate 112, and battery life of an inmate device 106(1) associated with the first inmate 112. In some embodiments, the prediction model includes hidden markov models, decision trees, regression models, support vector machines, or artificial neural networks.

Further, the location fencing server 104 notifies the administration of the controlled environment 102 of locations of the first inmate 112 and the second inmate 114 based in part on the location information 120. For example, the location fencing server 104 generates a map of the controlled environment 102 that displays the locations of the first inmate 112 and the second inmate 114 within the controlled environment 102. Further, the map displays visual information indicating whether the first inmate 112 and the second inmate 114 are within permissible geographic boundaries established by the administration of the controlled environment 102.

Figure 2:
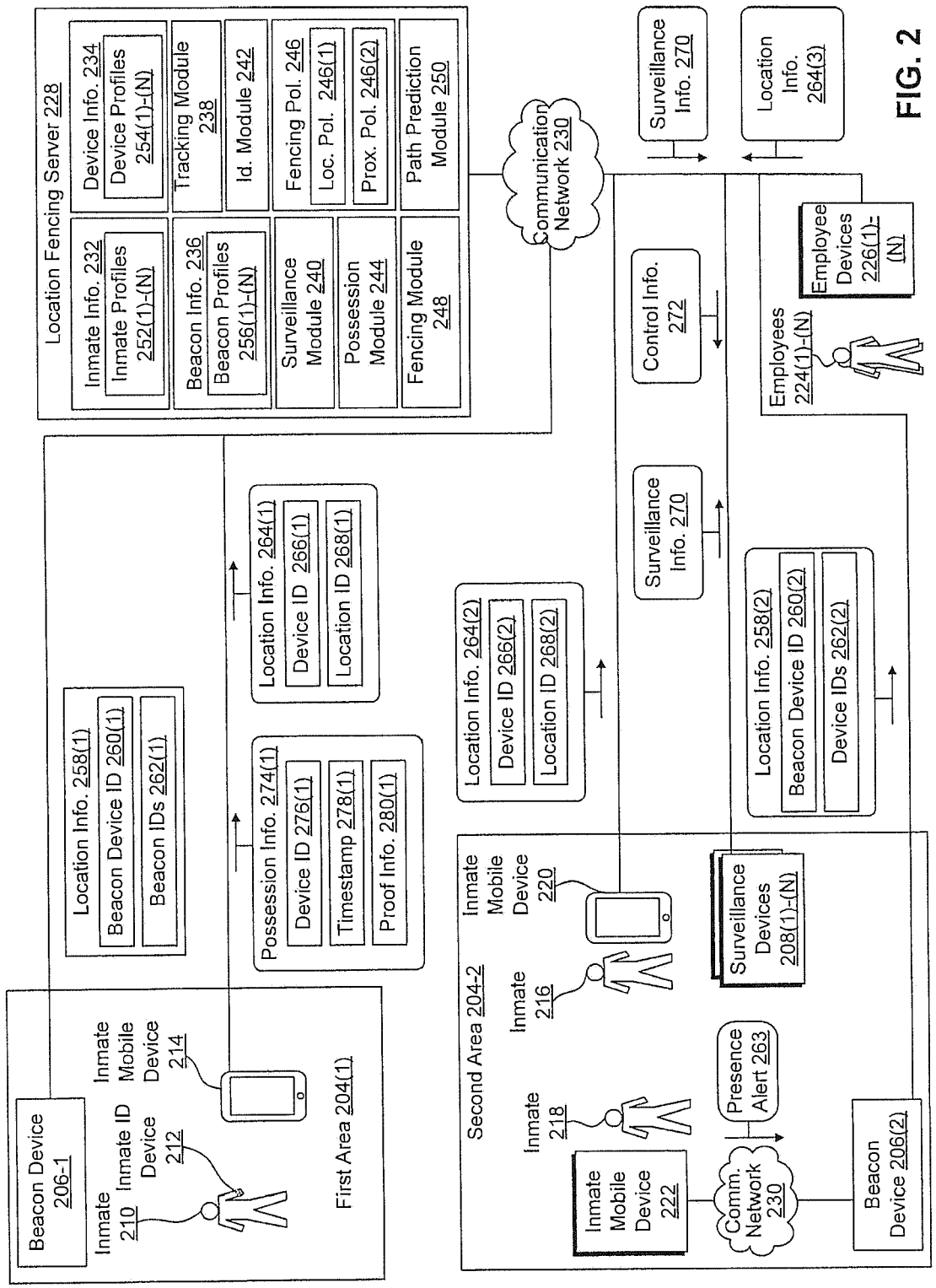
FIG. 2 illustrates a block diagram of an example framework for providing a location fencing system in a controlled environment, according to exemplary embodiments.

FIG. 2 illustrates a block diagram of an example framework for providing a location fencing system 200 in a controlled environment 202, according to an exemplary embodiment. As illustrated in FIG. 2, the controlled environment 202 includes a first area 204(1) and a second area 204(2). Some examples of the first area 204(1) and second area 204(2) include a cell block, dining hall, commissary, library, exercise yard, hallway(s), etc. Further, a first beacon device 206(1) is located within the first area 204(1), and a second beacon device 206(2) and one or more surveillance devices 208 are located within the second area 204(2).

Additionally, FIG. 2 illustrates a first inmate 210 currently located in the first area 204(1). The first inmate 210 is associated with an inmate identification device 212 and a first inmate mobile device 214. FIG. 2 further illustrates a second inmate 216 and a third inmate 218 located in the second area 204(2). The second inmate 216 is associated with a second inmate mobile device 220, and the third inmate 218 is associated with a third inmate mobile device 222.

Additionally, FIG. 2 illustrates one or more employees 224 employed by the administration of the controlled environment 202. Individual employees 224 are associated with particular employee devices 226 (e.g., medical personnel device, security personnel device, etc.). For example, a first employee 224(1) is associated with a first employee device 226(1), an Nth employee 224-N is associated with an Nth employee device 226-N, and so forth. Some examples of the employees 224 include correctional officers, medical staff, custodial staff, administrative staff, contractors, etc. In some instances, the employees 224 are responsible for monitoring the safety and/or well-being of the inmates (e.g., the first inmate 210, the second inmate 216, and the third inmate 218). Further, the employees 224 may monitor the inmates from a particular area of the controlled environment 202 or patrol the controlled environment 202. Additionally, or alternatively, the employees 224 may remotely monitor the inmates of the controlled environment 202.

FIG. 2 shows interactions between a location fencing server 228, the first beacon device 206(1), the second beacon device 206(2), the surveillance devices 208, the first inmate mobile device 214, the inmate identification device 212, the second inmate mobile device 220, the third inmate mobile device 222, and the employee devices 226. As illustrated in FIG. 2, a location fencing server 228, the first beacon device 206(1), the second beacon device 206(2), the surveillance device, the first inmate mobile device 214, the inmate identification device 212, the second inmate mobile device 220, the third inmate mobile device 222, and the employee devices 226 communicate via a communication network(s) 230.

The location fencing server 228 administers the location fencing system 200. Further, the location fencing server 228 includes inmate information 232, inmate device information 234, beacon device information 236, a tracking module 238, a surveillance module 240, an identification module 242, a possession module 244, fencing policies 246, a fencing module 248, and a path prediction module 250.

The inmate information 232 corresponds to the inmates (e.g., the first inmate 210, the second inmate 216, and the third inmate 218) within the controlled environment 202. In some embodiments, the inmate information 232 includes inmate profiles 252 corresponding to the inmates located within the controlled environment 202. For example, the first inmate profile 252(1) is associated with the first inmate 210, the second inmate profile 252(2) is associated with the second inmate 216, and so forth. In some instances, the inmate profiles 252 include information from one or more of a jail management system (JMS), an offender management system (OMS), a public database containing information on prison inmates, or booking information. Further, the inmate profiles 252 include incident history, daily schedules, historical daily location information, previous residences or correctional facilities, gang affiliations, family members, persons (e.g., victims, co-defendants, or witnesses) associated with legal proceedings involving an inmate, languages and/or dialects spoken by an inmate, device usage history, facial recognition information associated with an inmate, speech recognition information associated with the inmate, other biometric information, authentication information, authorization information, etc.

The inmate device information 234 corresponds to the inmate devices (e.g., the first inmate mobile device 214, the second inmate mobile device 220, the third inmate mobile device 222, and the inmate identification device 212) within the controlled environment 202. In some embodiments, the inmate device information 234 includes inmate device profiles 254 corresponding to the inmate devices located within the controlled environment 202. For example, the first inmate device profile 254(1) is associated with the first inmate mobile device 214, the second inmate device profile 254(2) is associated with the second inmate mobile device 220, the third inmate device profile 254(3) is associated with the third inmate mobile device 222, and so forth. In some instances, the inmate device profiles 254 include a device identifier, a device manufacturer, a firmware identifier, an operating system identifier, upgrade history, device capabilities, installed applications, historical daily location information, or device usage history. Further, in some instances, the inmate device profiles 254 identify an inmate currently in possession of an associated device, or a current location of an associated device.

The beacon device information 236 corresponds to the beacon devices 206 within the controlled environment 202. In some embodiments, the beacon device information 236 includes beacon device profiles 256 corresponding to individual beacon devices 206 located within the controlled environment 202. For example, the first beacon device profile 256(1) is associated with the first beacon device 206(1), the second beacon device profile 256(2) is associated with the second beacon device 206(2), and so forth. In some instances, the beacon device profiles 256 include a beacon device identifier, a location identifier corresponding to a location of a beacon device within the controlled environment 202, neighboring beacon devices 206 of a beacon device, a device manufacturer, firmware identifier, operating system identifier, upgrade history, device capabilities, and installed applications. Further, in some instances, the beacon device profiles 256 identify the inmates, the inmate mobile devices (e.g., the first inmate mobile device 214, the inmate identification device 212, the second inmate mobile device 220, and the third inmate mobile device 222), the employee devices 226, and the employees 224 currently within a predetermined distance of an associated beacon device.

The tracking module 238 monitors the location of the inmates (e.g., the first inmate 210, the second inmate 216, and the third inmate 218), the employees 224, inmate devices (e.g., the first inmate mobile device 214, the inmate identification device 212, the second inmate mobile device 220, and the third inmate mobile device 222), and employee devices 226 within the controlled environment 202. As illustrated in FIG. 2, the tracking module 238 receives location information 258 from the beacon devices 206. For example, the first beacon device 206(1) sends the first location information 258(1) to the location fencing server 228. Further, the first location information 258(1) includes a beacon device identifier 260(1) and device identifiers 262(1). As used herein, a beacon device identifier 260 includes a name, a coordinate, positional descriptor, an identifier capable of distinguishing a beacon device from other beacon devices within the controlled environment 202, or any information capable of identifying a location of a beacon device within the controlled environment 202. The device identifiers 262 are identifiers corresponding to inmate devices and employee devices 226 within a predetermined proximity of a transmitting beacon device 206.

For example, the first location information 258(1) includes a first collection of device identifiers 262(1) that includes device identifiers corresponding to the inmate identification device 212 and the first inmate mobile device 214, respectively. In some embodiments, the beacon devices 206 periodically detect the inmate devices and employee devices 226 within a predetermined proximity of the beacon devices 206, and send the location information 258 to the location fencing server 228.

As illustrated in FIG. 2, the beacon device 206(2) detects the third inmate mobile device 222 based at least in part on communications over the communication network 230(2). For example, the third inmate mobile device 222 sends a presence alert 263 to the beacon device 206(2). In some other examples, the beacon device 206(2) reads scannable indicia of the third inmate mobile device 222. For example, the second beacon device 206(2) detects an RFID tag of the third inmate mobile device 222.

As further illustrated in FIG. 2, the tracking module 238 receives location information 264 from inmate mobile devices (e.g., the first inmate mobile device 214 and the second inmate mobile device 220) and the employee devices 226. For example, the second inmate mobile device 220 sends the location information 264(2) to the location fencing server 228. Further, the location information 264(2) includes a device identifier 266(2) corresponding to the second inmate mobile device 220, and a location identifier 268(2) corresponding to the second inmate mobile device's 220 presence within the second area 204(2). As used herein, a location identifier includes a coordinate, positional descriptor, or any other information capable of identifying a location of an inmate mobile device within the controlled environment 202. In some embodiments, the inmate mobile devices and employee devices periodically send the location information 264 to the location fencing server 228.

Upon receipt of the location information 258 from the beacon devices 206, and the location information 264 from the inmate mobile devices and the employee devices 226, the tracking module 238 determines the locations of the inmate devices and the employee devices 226. Further, the tracking module 238 updates the inmate device information 234 to reflect the determined locations of the inmate mobile devices and the employee devices 226. For example, the tracking module 238 updates the third inmate device profile 254(3) associated with the third inmate mobile device 222 to indicate that the third inmate mobile device 222 is located within the second area 204(2) of the controlled environment 202.

In some embodiments, the tracking module 238 determines locations of the inmates and employees 224 based upon the location information 264. For instance, the tracking module 238 receives, from the first inmate mobile device 214, the location information 264(1) indicating that the first inmate mobile device 214 is currently located within the first area 204(1). Further, the tracking module 238 determines that the first inmate 210 is associated with the first inmate mobile device 214 based on the inmate information 232 or inmate device information 234. Additionally, the tracking module 238 verifies the first inmate 210 is currently located in the first area 204(1) using at least one of the possession module 244 or the identification module 242. Once the tracking module 238 verifies that the first inmate 210 is currently located in the first area 204(1) of the controlled environment 202, the location fencing server 228 updates the inmate information 232 to reflect the verification. For instance, the tracking module 238 updates the first inmate profile 252(1) corresponding to the first inmate 210 to indicate that the first inmate 210 is currently located in the first area 204(1).

In some embodiments, the tracking module 238 determines location of the inmates and employees 224 based upon the location information 258 received from the beacon devices 206. For instance, the tracking module 238 receives, from the second beacon device 206(2), the location information 258(2) indicating that the third inmate mobile device 222 is currently located within a predetermined distance of the second beacon device 206(2). Further, the tracking module 238 determines that the second beacon device 206(2) is located in the second area 204(2) based on the beacon device information 236. In addition, the tracking module 238 determines that the third inmate 218 is associated with the third inmate mobile device 222 based on the inmate information 232 or inmate device information 234.

Additionally, the tracking module 238 verifies the third inmate 218 is currently located in the second area 204(2) using at least one of the possession module 244 or the identification module 242. Once the tracking module 238 verifies that the third inmate 218 is currently located in the second area 204(2) of the controlled environment 202, the location fencing server 228 updates the inmate information 232 to reflect the verification. For instance, the tracking module 238 updates the third inmate profile 252(3) corresponding to the third inmate 218 to indicate that the third inmate 218 is currently located in the second area 204(2).

Figure 3:
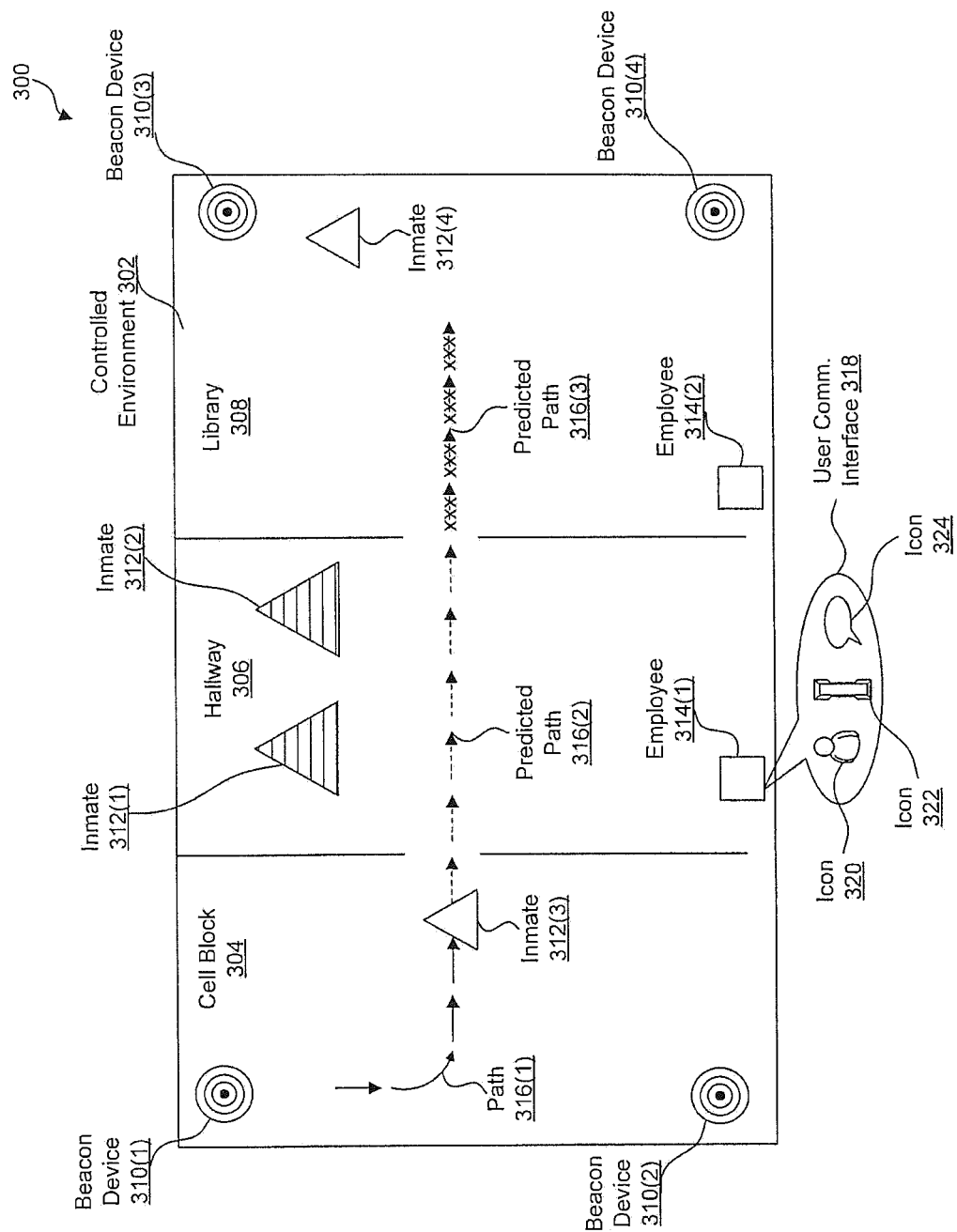
FIG. 3 illustrates an example graphical user interface for providing location fencing in a controlled environment, according to some implementations.

In addition, the tracking module 238 generates a graphical user interface including that illustrates at least the locations of the beacon devices 206, the inmates, and the employees 224 as further described herein with respect to FIG. 3.

The surveillance module 240 manages surveillance of the inmates and employees 224 within the controlled environment 202. The surveillance module 240 receives surveillance information 270 from the surveillance devices 208 within the controlled environment 202. Some examples of the surveillance devices 208 include surveillance cameras and audio surveillance microphones. Further, the surveillance information 270 includes audio capture, video captures, and sensor information. Used herein, audio capture refers to audio data captured by a recording device connected an inmate device, and stored to a storage component connected to the inmate device. Further, video capture refers to visual data captured by a video recording device, and stored to a storage component of an inmate device.

In addition, the surveillance module 240 sends control information 272 (e.g., instructions to pan, tilt, and/or zoom) to the surveillance devices 208 within the controlled environment 202. Additionally, the surveillance module 240 activates surveillance capabilities of the inmate mobile devices and the employee devices 226. For example, the surveillance module 240 sends the control information 272 to the second inmate mobile device 220, the control information 272 requesting that the second inmate mobile device 220 provide surveillance information 270 using one or more components (e.g., microphone, camera, biometric sensors, etc.) of the second inmate mobile device 220. In some examples, the tracking module 238 determines the surveillance devices 208 in close proximity to the violation of a fencing policy 246. Further, the surveillance module 240 sends the control information 272 requesting the surveillance information 270 to the surveillance devices 208 determined to be in close proximity to the violation of the fencing policy 246. Upon receipt of the surveillance information 270, the surveillance module 240 sends the surveillance information 270 to the employee devices 226.

As described above, the identification module 242 verifies the locations of inmates and employees 224 within the controlled environment 202. In some embodiments, the identification module 242 verifies that an inmate is currently located at a particular location within the controlled environment 202 based on performing biometric analysis of the surveillance information 270. For example, the tracking module 238 requests that the identification module 242 verify that the second inmate 216 is currently located in the second area 204(2) of the controlled environment 202. Further, the identification module 242 analyzes the surveillance information 270 using facial recognition techniques and/or voice recognition techniques to determine whether second inmate 216 is currently located within the second area 204(2).

In some embodiments, the identification module 242 employs facial detection and facial recognition techniques to analyze the faces present in the surveillance information 270. For example, the identification module 242 detects the presence of one or more faces by analyzing the surveillance information 270 for features and/or attributes indicative of the presence of a face (e.g., features indicative of a mouth, eyes, and/or nose). Additionally, the identification module 242 detects facial data points included in the surveillance information 270 at the portions of the surveillance information 270 corresponding to the features indicative of the presence of a face. Further, the identification module 242 compares a number of facial data points in the detected facial data with a number of facial data points from the inmate information 232 using machine learning and/or pattern recognition techniques. Facial data included but is not limited to facial data information representing the characteristics of a person's face such as distances between eyes, nose, and mouth, and shapes of the eyes, nose, mouth, jaw. Facial data also includes facial information created from, for example, a hash function, of the facial data points.

The possession module 244 determines whether an inmate is in possession of an inmate mobile device (e.g., the first inmate mobile device 214, the second inmate mobile device 220, and the third inmate mobile device 222). For example, the possession module 244 determines that the first inmate 210 is currently in possession of an inmate mobile device 214 based on possession information 274(1) received from the first inmate mobile device 214.

In some embodiments, the possession module 244 determines that the first inmate 210 is in possession of the first inmate mobile device 214 based at least in part on an interaction and/or communication between the inmate identification device 212 and the first inmate mobile device 214. In some embodiments, the first inmate mobile device 214 determines identification information of the inmate identification device 212. For example, the inmate identification device 212 comprises an RFID tag including identification information, and the first inmate mobile device 214 reads the RFID tag of the inmate identification device 212. In some other examples, the first inmate mobile device 214 requests the identification information from the inmate identification device 212 in a request communication, and receives the identification information from the inmate identification device 212 in a reply communication.

Further, the first inmate mobile device 214 sends the possession information 274(1) to the location fencing server 228. The possession information 274(1) includes a device identifier 276(1) identifying the first inmate mobile device 214, a timestamp 278(1) indicating the time of the interaction between the inmate identification device 212 and the first inmate mobile device 214, and proof information 280(1) based at least in part on the captured identification information.

Some examples of the proof information 280 include onetime passwords, secrets, authentication codes, pins, visual indicia, device identifiers, user identifiers, etc. For example, the inmate identification device 212 periodically generates onetime passwords according to a fixed schedule. Further, the first inmate mobile device 214 may read scannable indicia that include the one time password via an interaction between the first inmate mobile device 214 and the inmate identification device 212, and send data associated with the onetime password as the proof information 280(1) in the possession information 274(1).

Upon receipt of the possession information 274(1), the possession module 244 determines that the first inmate 210 is associated with the first inmate mobile device 214 based upon first inmate profile 252(1) or the first inmate device profile 254(1), determines whether the proof information 280(1) meets freshness requirements based upon the timestamp 278(1), and verifies the proof information 280(1). In some examples, the possession module 244 verifies the proof information 280(1) based at least in part on comparing the proof information 280(1) to inmate device information 234 associated with the inmate identification device 212.

In some embodiments, the possession module 244 utilizes temporal synchronization information to verify the proof information 280. For example, the possession module 244 utilizes temporal synchronization information shared between the inmate identification device 212 and the location fencing server 228 to verify a one-time password. In some other embodiments, the possession module 244 utilizes a mathematical algorithm, and challenge information shared between the inmate identification device 212 and the location fencing server 228 to verify a one-time password.

If the proof information 280(1) meets freshness requirements and the proof information 280(1) is verified, the possession module 244 determines that the first inmate 210 is in possession of the first inmate mobile device 214. Further, the tracking module 238 associates a location of the first inmate mobile device 214 with the first inmate 210. For instance, the tracking module 238 updates the location of the first inmate 210 in the first inmate profile 252(1) to the location of the first inmate 210 device within the controlled environment 202.

Alternatively, if the proof information 280(1) fails verification, the possession module 244 may determine that the first inmate 210 has been dispossessed of the first inmate mobile device 214. As a result, the tracking module 238 updates the inmate profile 252(1) and the inmate device profile 254(1) to indicate that the first inmate 210 is no longer associated with the first inmate mobile device 214. Further, the possession module 244 may notify the administration or employees 224 of the controlled environment 202 of the dispossession.

In some embodiments, the possession module 244 determines that an inmate is in possession of an inmate mobile device (e.g., the first inmate mobile device 214, the second inmate mobile device 220, and the third inmate mobile device 222) based at least in part on information captured by the inmate mobile device. For instance, the second inmate mobile device 220 may receive authentication information from a user of the second inmate mobile device 220. Some examples of authentication information include biometric information (e.g., facial recognition, fingerprint identification information, palm print identification information, iris recognition information, retina recognition information, voice recognition information, etc.), credentials, secrets, passwords, etc.

Further, the second inmate mobile device 220 sends the possession information 274(2) to the location fencing server 228. The possession information 274(2) includes a device identifier 276(2) identifying the second inmate mobile device 220, a timestamp 278(2) indicating the time of capture of the authentication information, and proof information 280(2) based at least in part on the captured authentication information. Upon receipt of the possession information 274(2), the possession module 244 determines that the second inmate 216 is associated with the second inmate mobile device 220 based upon second inmate profile 252(2) or the second inmate device profile 254(2), determines whether the proof information 280(2) meets freshness requirements based upon the timestamp 278(2), and verifies the proof information 280(2). If the proof information 280(2) meets freshness requirements and the proof information 280(2) is verified, the possession module 244 determines that the second inmate 216 is in possession of the second inmate mobile device 220. Further, the tracking module 238 associates a location of the second inmate mobile device 220 with the second inmate 216. For instance, the tracking module 238 updates the location of the second inmate 216 in the second inmate profile 252(2) to the location of the second inmate 216 device within the controlled environment 202. In some examples, the possession module 244 verifies the proof information 280(2) based at least in part on comparing the proof information 280(2) to authentication information included in the second inmate profile 252(2) associated with the second inmate 216.

Alternatively, if the proof information 280(2) fails verification, the possession module 244 may determine that the second inmate 216 has been dispossessed of the second inmate mobile device 220. As a result, the tracking module 238 updates the second inmate profile 252(2) and the second inmate device profile 254(2) to indicate that the second inmate 216 is no longer associated with the second inmate mobile device 220. Further, the possession module 244 may notify the administration or employees 224 of the controlled environment 202 of the dispossession.

The fencing policies 246 include location policies 246(1) and proximity policies 246(2). The location policies 246(1) include information identifying permissible geographic boundaries for the inmates. For example, a location policy 246(1) may indicate that the first inmate 210 is permitted to be present in the first area 204(1) during a predetermined time period. As another example, a location policy 246(1) may indicate that the first inmate 210 is not permitted to be present in the second area 204(2) during a predetermined time period. A location policy 246(1) may include an inmate identifier identifying the inmate that is the subject of the location policy 246(1), one or more location identifiers corresponding to a geographic location, a value indicating whether the inmate is permitted or unpermitted to occupy the geographic location, and dates and/or times that the location policy is applicable.

The proximity policies 246(2) include information identifying inmates (e.g., the first inmate 210, the second inmate 216, and the third inmate 218) that are not permitted to be within a predetermined proximity of each other. In some instances, the proximity policies 246(2) are generated to prevent conspiring by inmates. For example, if the first inmate 210 and the third inmate 218 belong to the same criminal organization, the administration of the controlled environment 202 may want to enforce a proximity policy 246(2) restricting the first inmate 210 and the third inmate 218 from coming into contact. In some other instances, the proximity policies 246(2) are generated to prevent potential violence between inmates. For example, if the first inmate 210 and the second inmate 216 have a physical or verbal altercation, the administration of the controlled environment 202 may want to enforce a proximity policy 246(2) restricting the first inmate 210 and the second inmate 216 from coming into further contact. A proximity policy 246(2) may include inmate identifiers identifying at least two inmates associated with the proximity policy 246(2), a threat level corresponding to the potential for physical confrontation between the inmates, one or more location identifiers identifying locations where the at least two inmates are not permitted to come into contact, and a predetermined distance that the identified inmates must stay away from each other.

The fencing module 248 generates the fencing policies 246. In some embodiments, the fencing module 248 dynamically generates the proximity policies 246(2) based at least in part on the inmate information 232. For instance, the fencing module 248 generates a proximity policy 246(2) restricting contact between the first inmate 210 and the second inmate 216 based at least in part on an incident report of the inmate information 232 indicating that the first inmate 210 and the second inmate 216 were involved in a physical altercation. As another instance, the fencing module 248 generates a proximity policy 246(2) restricting contact between the first inmate 210 and the third inmate 218 based on determining that the inmate information 232 indicates that the first inmate 210 and the third inmate 218 are members of the same criminal organization. As yet still another instance, the fencing module 248 generates a proximity policy 246(2) restricting contact between the first inmate 210 and the third inmate 218 based on determining that the inmate information 232 indicates that the first inmate 210 testified against an associate of the third inmate 218. In some embodiments, the fencing module 248 employs machine learning techniques to generate the fencing policies 246. Additionally, or alternatively, the employees 224 of the controlled environment 202 may create proximity policies 246(2) based on employee input to the fencing module 248.

In certain embodiments, the proximity policies 246(2) include a threat level indicating a probability of a violent confrontation occurring. In some embodiments, the fencing module 248 dynamically determines the threat level based upon previous interactions between the inmates associated with the proximity policy 246(2), and/or one or more attributes of the inmates associated with the proximity policy 246(2). For instance, if the first inmate 210 and the second inmate 216 are involved in a physical confrontation, the fencing module 248 sets the threat level of a proximity policy 246(2) corresponding to the first inmate 210 and the second inmate 216 to a higher threat level. As another instance, if the inmate information indicates that the first inmate 210 and the second inmate 216 are members of rival gangs and both over the age of sixty-five, the fencing module 248 sets the threat level of a proximity policy 246(2) corresponding to the first inmate 210 and the second inmate 216 to a lower threat level.

Further, the fencing module 248 determines whether inmates (e.g., the first inmate 210, the second inmate 216, and the third inmate 218) of the controlled environment 202 are in violation of the fencing policies 246. For example, fencing module 248 determines that the second inmate 216 and the third inmate 218 are within an area of the controlled environment 202 based upon the tracking module 238 or beacon device information 236. Additionally, the fencing module 248 determines whether any of the proximity policies 246(2) apply to the second inmate 216 and the third inmate 218. If one of the proximity policies 246(2) apply to the second inmate 216 and the third inmate 218, the fencing module 248 may send a notification 282 to the employee devices 226 or generates an alert on a graphical user interface illustrating portions of the controlled environment 202. In some examples, the tracking module 238 determines the employee devices 226 in close proximity to the violation of the fencing policies 246. Further, the fencing module 246 sends the notification 282 employee devices determined to be in close proximity to the violation of the fencing policy 246. Additionally, or alternatively, the fencing module 248 sends the notification 282 to the second inmate mobile device 220 and the third inmate mobile device 222 warning them about the violation of the proximity policy 246(2).

In addition, the fencing module 248 determines whether a predicted path of an inmate may cause a violation of the fencing policies 246. For instance, if a predicted path of the first inmate 210 would cause the first inmate 210 to be in the same area as the second inmate 216 in violation of a proximity policy 246(2), the fencing module 248 sends a notification 282 to the employee devices 226 or generates an alert on a graphical user interface illustrating portions of the controlled environment 202. Additionally, or alternatively, the fencing module 248 sends the notification 282 to the first inmate 210 and the second inmate 210 warning them about the potential violation of the proximity policy 246(2). In some embodiments, the notification 282 further includes instructions for avoiding a potential violation of a proximity policy 246(2).

The path prediction module 250 determines predicted travel paths and locations for the inmates (e.g., the first inmate 210, the second inmate 216, and the third inmate 218) of the controlled environment. As described in detail above, the predicted path is based at least in part on the inmate information 232. For example, the path prediction module 250 determines a predicted path for the first inmate 210 based at least in part on historical daily location information corresponding to the first inmate 210, a daily schedule corresponding to the first inmate 210, and historical daily location information corresponding to other inmates similar to the first inmate 210.

FIG. 3 illustrates an example graphical user interface 300 generated by the tracking module 238. Further, the graphical user interface 300 includes information determined by the surveillance module 240, the identification module 242, the possession module 244, the fencing module 248, and the path prediction module 250.

The graphical user interface 300 includes a graphical representation of at least a portion of a controlled environment 302. As shown in FIG. 3, the graphical user interface 300 demarcates an area for a cell block 304, an area for a hallway 306, and a library 308. Further, the graphical user interface 300 displays visual representations of the beacon devices 310 within the controlled environment.

Additionally, the graphical user interface 300 displays visual representations of the inmates 312 and employees 314 located within the controlled environment 302. In some examples, the location fencing server 228 employs the tracking module 238, the surveillance module 240, the identification module 242, the possession module 244, the fencing module 248 to determine the location of the inmates 312 and employees 314 represented within the graphical user interface 300. For example, the inmates 312 are visually represented as triangles, and the employees 314 are represented as squares.

In some embodiments, the graphical user interface 300 uses graphical effects to distinguish between inmates 312 in violation of a proximity policy 246(2), and other inmates 312 within the controlled environment 302. Suppose, the inmate 312(1) and the inmate 312(2) are within the same area of the controlled environment 302 in violation of a proximity policy 246(2). In response, the graphical user interface 300 applies graphical effects to the representations of the inmate 312(1) and the inmate 312(2). Some examples of graphical effects include a graphic scheme, color scheme (e.g., brightness intensity lightness, darkness), or graphic element.

As shown in FIG. 3, the inmate 312(1) and the inmate 312(2) are visually represented by striped triangles that are larger in size than the visual representations of the other inmates 312. Although FIG. 3 illustrates the aforementioned representations, the representations can be implemented according to any combination of shape, style, color, etc. Additionally, the graphical effects may be used to communicate the threat level of the violation of the proximity policy 246(2).

Further, FIG. 3 illustrates an inmate path 316 of the inmate throughout the controlled environment. In some embodiments, the inmate path 316 is based at least in part on the tracking module 238 and the path prediction module 250. As shown in FIG. 3, the inmate path 316 includes a previously traveled path 316(1), a first predicted path 316(2), and a second predicted path 316(3). In order to illustrate that the second predicted path 316(2) would cause the inmate 312(3) and the inmate 312(4) to be in violation of a proximity policy 246(2), the graphical user interface 300 distinguishes between the component of the predicted path (i.e., the first predicted path 316(1)) that is in accordance with the proximity policy 246(2), and the portion of the predicted path (i.e., the second predicted path 316(3)) that is in violation of the proximity policy 246(2). Further, the graphical user interface 300 displays the inmate path 316 with various graphical effects to distinguish between a previous path, actual path, and a predicted path. Additionally, the graphical user interface 300 displays the inmate path 316 with various graphical effects to distinguish between components of the path in accordance with the proximity policies 246(2), and components of the path in violation of the proximity policies 246(2).

Furthermore, the representations of the inmates 312 and employees 314 are selectable via the graphical user interface 300. In some examples, the graphical user interface 300 further provides functionality for displaying additional information about the inmates 312 or employees 314 associated with a selected representation, sending commands to a device associated with the selected representation, and/or communicating with the device associated with the selected representation.

For example, the graphical user interface 300 includes a communication user interface 318 that provides a selectable icon 320 for displaying additional information about the employee 314(1), a selectable icon 322 for initiating a voice communication with the employee 314(1), and a selectable icon 324 for initiating a textual communication with the employee 314(1).

Figure 4:
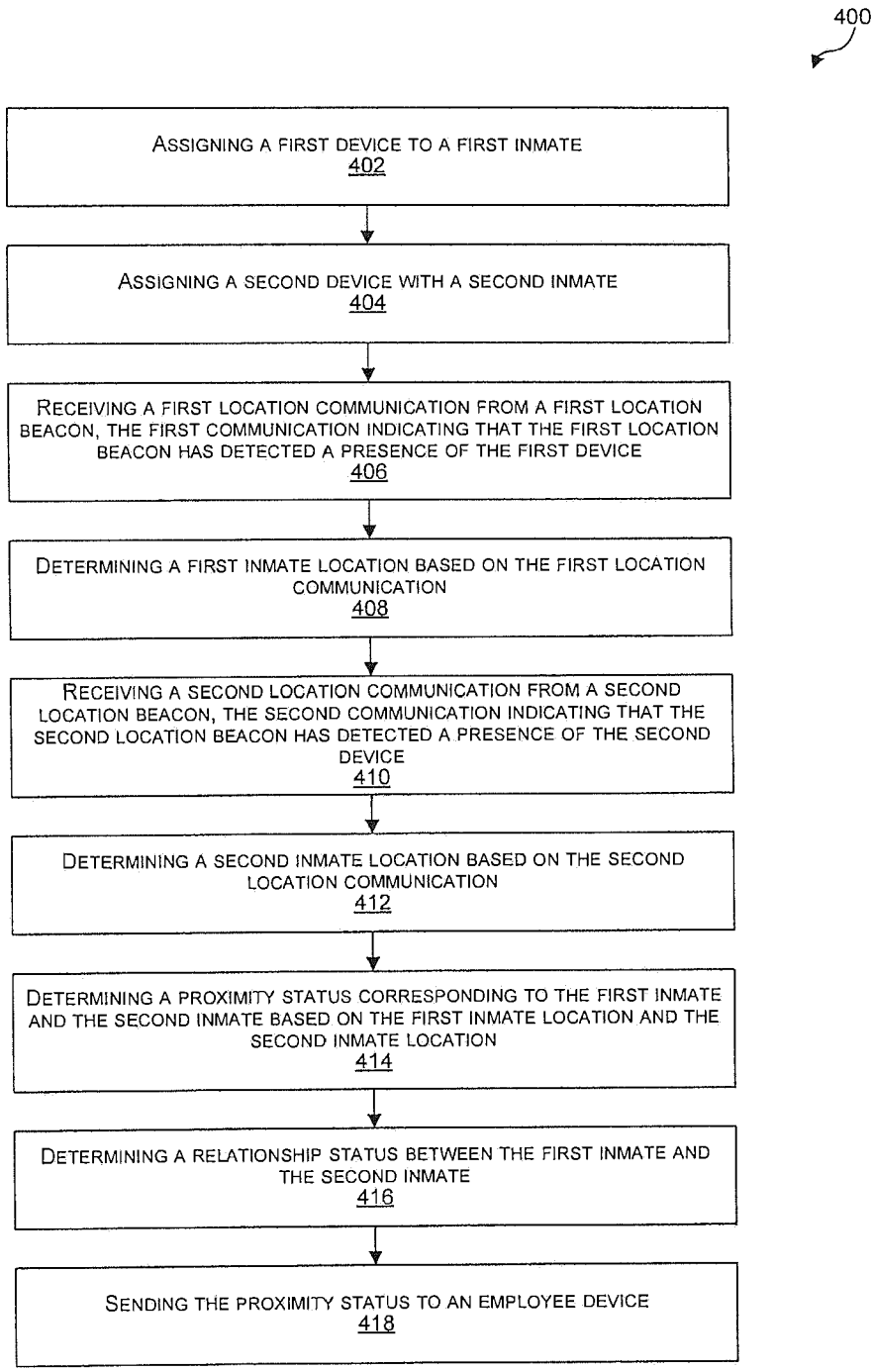
FIG. 4 is a flow diagram illustrating an example process for location fencing within a controlled environment according to exemplary embodiments.

FIG. 4 illustrates a process 400 for providing an emergency response within a controlled environment according to some implementations. The process 400 is illustrated as a collection of blocks in a logical flow graph, which represent a sequence of operations that can be implemented in hardware, software, or a combination thereof. The blocks are referenced by numbers 402-418. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 402, a location fencing server assigns a first device to a first inmate. For example, the location fencing server 228 updates the first inmate profile 252(1) to indicate that the first inmate 210 is associated with the first inmate mobile device 214. In some embodiments, an identifier of the first inmate 210 is mapped to an identifier of the first inmate mobile device 214 within the first inmate profile 252(1) and/or the first inmate device profile 254(1).

At 404, the location fencing server assigns a second device to a second device.

For example, the location fencing server 228 updates the second inmate profile 252(2) to indicate that the second inmate 216 is associated with the second inmate mobile device 220. In some embodiments, an identifier of the second inmate 216 is mapped to an identifier of the second inmate mobile device 220 within the second inmate profile 252(2) and/or the second inmate device profile 254(2).

At 406, the location fencing server receives a first location communication from a first location beacon, the first location communication indicating a first interaction with the first device. For example, the location fencing server 228 receives the location information 258(1) from the first beacon device 206(1). Further, the location information 258(1) includes the collection of device identifiers 262(1) including the device identifier 266(1) of the first inmate mobile device 214. Upon receipt of the location information 258(1), the tracking module 238 updates the device profile 254(1) associated with the first inmate mobile device 214 to indicate that the first inmate mobile device 214 is currently located in the first area 204(1) of the controlled environment 202 associated with the first beacon device 206(1).

In certain embodiments, the first beacon device 206(1) receives a presence alert from the first inmate mobile device 214. In response, the first beacon device 206(1) includes the device identifier 262(1) of the first inmate mobile device 214 in the location information 258(1). In some other embodiments, the first beacon device 206(1) reads scannable indicia of the first inmate mobile device 214. For example, the first beacon device 206(1) detects an RFID tag of the first inmate mobile device 214. In response, the first beacon device 206(1) includes the device identifier 266(1) of the first inmate mobile device 214 in the location information 258(1).

At 408, the location fencing server determines a first inmate location based at least in part on the first location communication. For example, the location fencing server 228 determines that the first inmate 210 is currently located in the first area 204(1) associated with the first beacon device 206(1) based on determining that the first inmate 210 is associated with the first inmate mobile device 214, and the first inmate mobile device 214 is within a predetermined proximity of the first beacon device 206(1). In some examples, the tracking module 238 determines that the first inmate 210 associated with the first inmate mobile device based on the inmate profile 252(1) associated with the first inmate 210, and/or inmate device profile 254(1) associated with the first inmate mobile device 214.

At 410, the location fencing server receives a second location communication from a second location beacon, the second communication indicating a second interaction with the second device. For example, the location fencing server 228 receives the location information 258(2) from the second beacon device 206(2). Further, the location information 258(2) includes the collection of device identifiers 262(2) including the device identifier 266(1) of the second inmate mobile device 220. Upon receipt of the location information 258(2), the tracking module 238 updates the device profile 254(2) associated with the second inmate mobile device 220 to indicate that the second inmate mobile device 220 is currently located in the second area 204(2) of the controlled environment 202 associated with the second beacon device 206(2).

At 412, the location fencing server determines a second inmate location based at least in part on the second location communication. For example, the location fencing server 228 determines that the second inmate is currently located in the second area associated with the second beacon device based on determining that the second inmate is associated with the second mobile inmate device and the second mobile inmate device is located within the second area. In some examples, the tracking module 238 determines that the second inmate 216 associated with the second inmate mobile device 220 based on the inmate profile 252(2) associated with the first inmate 216, and/or inmate device profile 254(2) associated with the second inmate mobile device 220.

At 414, the location fencing server determines a proximity status corresponding to the first inmate and the second inmate based on the first inmate location and the second inmate location. For example, the fencing module 248 determines the distance between the first inmate 210 and the second inmate 216 based at least in part on the first inmate location and the second inmate location. In some other examples, the fencing module 248 determines whether the first inmate 210 and the second inmate 216 are in the same area of the controlled environment based at least in part on the first inmate location and the second inmate location.

At 416, the location fencing server determines a relationship status between the first inmate and the second inmate. For example, the fencing module 248 determines whether there is currently an applicable proximity policy 246(2) associated to the first inmate 210 and the second inmate 216. In some embodiments, a proximity policy 246(2) indicates that the first inmate 210 and second inmate 216 are not permitted to be within a predetermined distance of each other. In certain embodiments, a proximity policy 246(2) indicates that the first inmate 210 and second inmate 216 are not permitted to be within the same area (e.g., the first area 204(1) or the second area 204(2)) of the controlled environment 202.

At 418, the location fencing server sends the proximity status to an employee device. For example, the location fencing server 228 sends a notification to the employee devices 226 that the first inmate 210 and the second inmate 216 are in a violation of at least one of the proximity policies 246(2).

Figure 5:
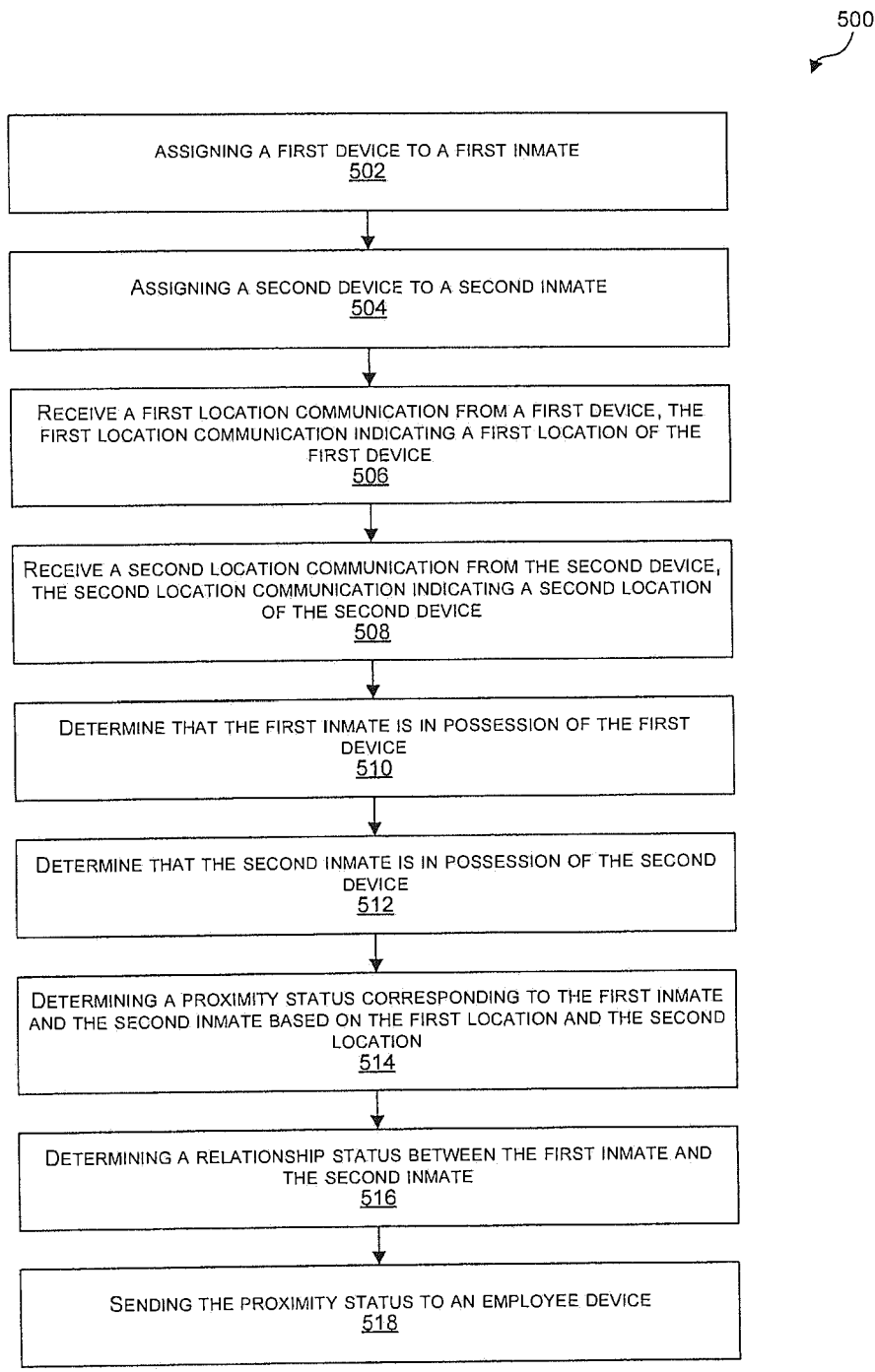
FIG. 5 is a flow diagram illustrating an example process for location fencing within a controlled environment according to exemplary embodiments.

FIG. 5 illustrates a process 500 for providing an emergency response within a controlled environment according to some implementations. The process 500 is illustrated as a collection of blocks in a logical flow graph, which represent a sequence of operations that can be implemented in hardware, software, or a combination thereof. The blocks are referenced by numbers 502-518. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 502, a location fencing server assigns a first device to a first inmate. For example, the location fencing server 228 updates the first inmate profile 252(1) to indicate that the first inmate 210 is associated with the first inmate mobile device 214. In some embodiments, an identifier of the first inmate 210 is mapped to an identifier of the first inmate mobile device 214 within the first inmate profile 252(1) and/or the first inmate device profile 254(1).

At 504, the location fencing server assigns a second device to a second inmate.

For example, the location fencing server 228 updates the second inmate profile 252(2) to indicate that the second inmate 216 is associated with the second inmate mobile device 220. In some embodiments, an identifier of the second inmate 216 is mapped to an identifier of the second inmate mobile device 220 within the second inmate profile 252(2) and/or the second inmate device profile 254(2).

At 506, the location fencing server receives a first location communication from the first device, the first location communication indicating a first location of the first device. For example, the location fencing server 228 receives the location information 264(1) from the first inmate mobile device 214. Further, the location information 264(1) includes the location identifier 268(1) that indicates that the first inmate mobile device 214 is present within the first area 204(1). Upon receipt of the location information 264(1), the tracking module 238 updates the device profile 254(1) associated with the first inmate mobile device 214 to indicate that the first inmate mobile device 214 is currently located in the first area 204(1) of the controlled environment 202.

At 508, the location fencing server receives a second location communication from the second device, the second location communication indicating a second location of the second device. For example, the location fencing server 228 receives the location information 264(2) from the second inmate mobile device 220. Further, the location information 264(2) includes the location identifier 268(2) that indicates that the second inmate mobile device 220 is present within the second area 204(2). Upon receipt of the location information 264(2), the tracking module 238 updates the device profile 254(2) associated with the second inmate mobile device 220 to indicate that the second inmate mobile device 220 is currently located in the second area 204(2) of the controlled environment 202.

At 510, the location fencing server determines that the first inmate is in possession of the first device. For instance, the first inmate mobile device 214 sends the possession information 274(1) to the location fencing server 228. As described in detail above, the possession information 274(1) includes the proof information 280(1). Upon receipt of the possession information 274(1), the possession module 244 determines whether the proof information 280(1) meets freshness requirements based upon the timestamp 278(1), and verifies the proof information 280(1). If the proof information 280(1) meets freshness requirements and the proof information 280(1) is verified, the possession module 244 determines that the first inmate 210 is in possession of the first inmate mobile device 214.

At 512, the location fencing server determines that the second inmate is in possession of the second device. For instance, the second inmate mobile device 220 sends the possession information 274(2) to the location fencing server 228. As described in detail above, the possession information 274(2) includes the proof information 280(2). Upon receipt of the possession information 274(2), the possession module 244 determines whether the proof information 280(2) meets freshness requirements based upon the timestamp 278(2), and verifies the proof information 280(2). If the proof information 280(2) meets freshness requirements and the proof information 280(2) is verified, the possession module 244 determines that the second inmate 216 is in possession of the second inmate mobile device 220.

At 514, the location fencing server determines a proximity status corresponding to the first inmate and the second inmate based on the first location and the second location. For example, the fencing module 248 determines the distance between the first inmate 210 and the second inmate 216 based at least in part on the first inmate location and the second inmate location. In some other examples, the fencing module 248 determines whether the first inmate 210 and the second inmate 216 are in the same area of the controlled environment based at least in part on the first inmate location and the second inmate location.

At 516, the location fencing server determines a relationship status between the first inmate and the second inmate. For example, the fencing module 248 determines whether there is currently an applicable proximity policy 246(2) associated to the first inmate 210 and the second inmate 216.

At 518, the location fencing server sends the proximity status to an employee device. For example, the location fencing server 228 sends a notification to the employee devices 226 that the first inmate 210 and the second inmate 216 are in a violation of at least one of the proximity policies 246(2).

Figure 6:
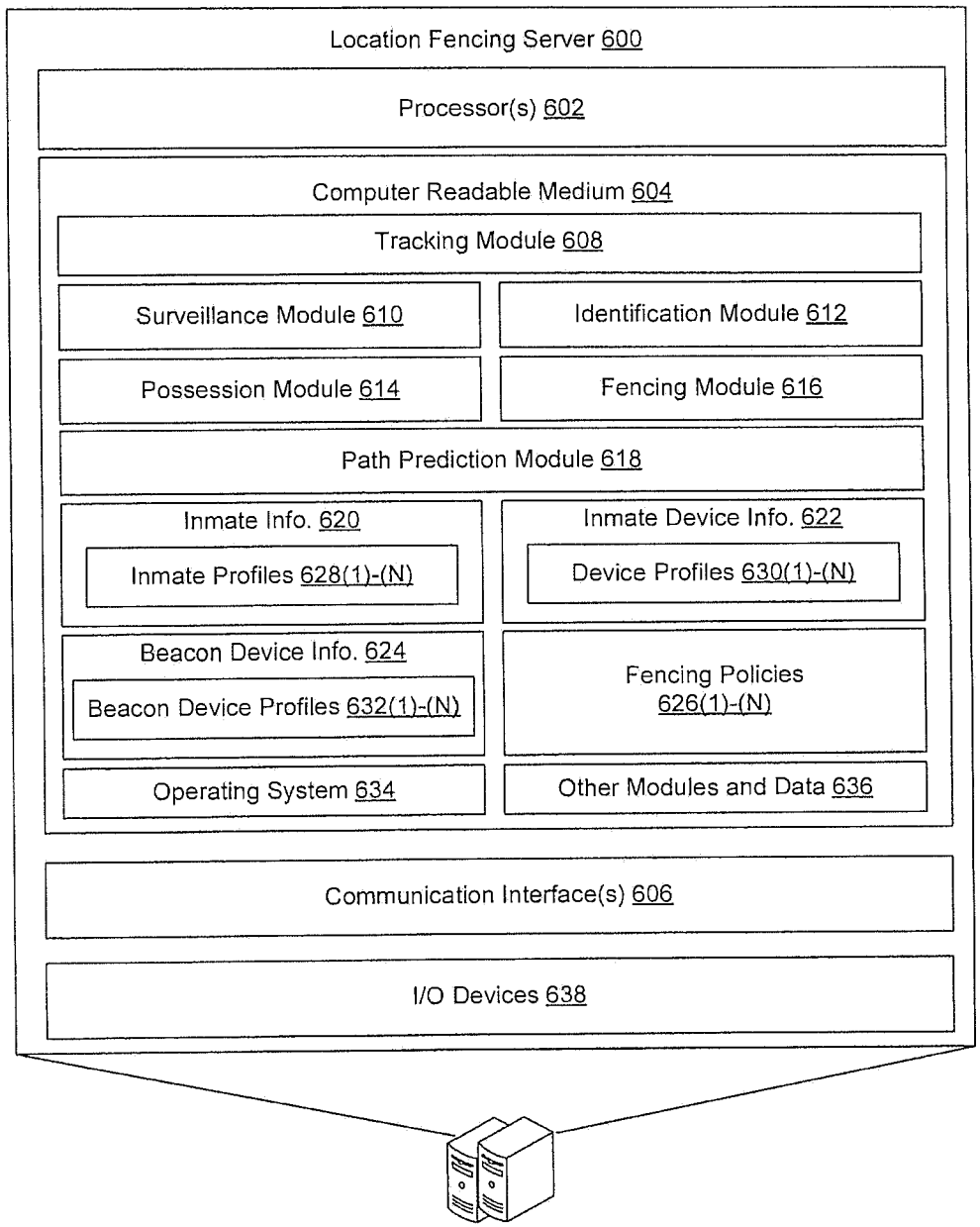
FIG. 6 illustrates a block diagram of select components of an example location fencing server, according to exemplary embodiments.

FIG. 6 illustrates select components of the location fencing server 600, such as location fencing server 104 and location fencing server 228. The location fencing server 600 includes one or more servers or other types of computing devices that may be embodied in any number of ways. For instance, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the location fencing server 600 as being present in a single location, these components and data may alternatively be distributed across different computing devices and different locations in any manner. Consequently, the functions may be implemented by one or more computing devices, with the various functionality described above distributed in various ways across the different computing devices. Multiple location fencing servers 600 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, the location fencing server 600 includes one or more processors 602, one or more computer-readable media 604, and one or more communication interfaces 606. Each processor 602 is a single processing unit or a number of processing units, and may include single or multiple computing units or multiple processing cores. The processor(s) 602 can be implemented as one or more microprocessors, microcomputers, microcontrollers, digital signal processors, central processing units, state machines, logic circuitries, and/or any devices that manipulate signals based on operational instructions. For instance, the processor(s) 602 may be one or more hardware processors and/or logic circuits of any suitable type specifically programmed or configured to execute the algorithms and processes described herein. The processor(s) 602 can be configured to fetch and execute computer-readable instructions stored in the computer-readable media 604, which can program the processor(s) 602 to perform the functions described herein.

The computer-readable media 604 include volatile and nonvolatile memory and/or removable and non-removable media implemented in any type of technology for storage of information, such as computer-readable instructions, data structures, program modules, or other data. Such computer-readable media 604 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the location fencing server 600, the computer-readable media 604 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 604 is used to store any number of functional components that are executable by the processors 602. In many implementations, these functional components comprise instructions or programs that are executable by the processors and that, when executed, specifically configure the one or more processors 602 to perform the actions attributed above to the location fencing server 600. In addition, the computer-readable media 604 store data used for performing the operations described herein.

In the illustrated example, the functional components stored in the computer-readable media 604 include a tracking module 608, a surveillance module 610, an identification module 612, a possession module 614, a proximity module 616, and a path prediction module 618. Further, the computer-readable media store inmate information 620, inmate device information 622, beacon device information 624, and proximity policies 626. In addition, the inmate information 620 includes inmate profiles 628, the inmate device information 622 includes inmate device profiles 630, and the beacon device information 624 includes beacon device profiles 632.

Additional functional components stored in the computer-readable media 604 include an operating system 634 for controlling and managing various functions of the location fencing server 600. The location fencing server 600 also include or maintain other functional components and data, such as other modules and data 636, which include programs, drivers, etc., and the data used or generated by the functional components. Further, the location fencing server 600 includes many other logical, programmatic and physical components, of which those described above are merely examples that are related to the discussion herein.

The communication interface(s) 606 include one or more interfaces and hardware components for enabling communication with various other devices, such as the inmate mobile devices (e.g., the first inmate mobile device 214, the second inmate mobile device 220, and the third inmate mobile device 222), the employee devices 226, or other computing devices, over the network(s) 230. For example, communication interface(s) 606 facilitate communication through one or more of the Internet, cable networks, cellular networks, wireless networks (e.g., Wi-Fi, cellular) and wired networks. As several examples, the location fencing server 600 and the first inmate mobile device 214 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

The location fencing server 600 may further be equipped with various input/output (I/O) devices 638. Such I/O devices include a display, various user interface controls (e.g., buttons, joystick, keyboard, mouse, touch screen, etc.), audio speakers, connection ports and so forth.

Figure 7:
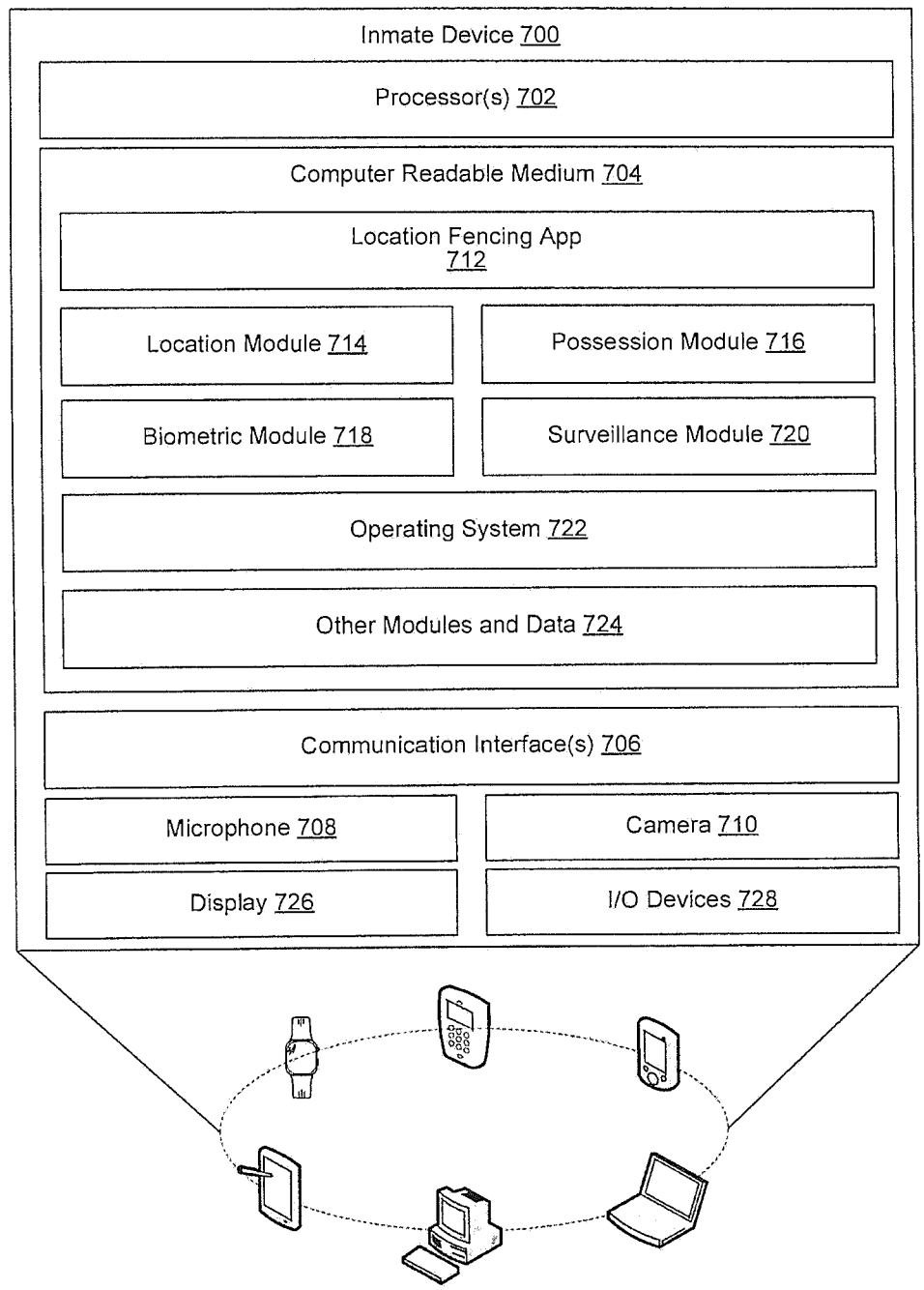
FIG. 7 illustrates a block diagram of select components of an example inmate device, according to exemplary embodiments.

FIG. 7 illustrates select example components of the inmate device 700 (e.g., the first inmate mobile device 214, the second inmate mobile device 220, the third inmate mobile device 222, and the employee devices 226) that implements the functionality described above, according to an exemplary embodiment. The inmate device 700 may be any of a number of different types of personal computing devices. Some examples of the inmate device 700 include smart phones and mobile communication devices, tablet computing devices, desktops, laptops, netbooks and other portable computers, wearable computing devices, and any other portable device capable of sending communications and performing the functions according to the techniques described herein.

In the illustrated example, the inmate device 700 includes one or more processors 702, one or more computer-readable media 704, one or more communication interfaces 706, a microphone 708, and a camera 710. Each processor 702 is a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 include volatile and nonvolatile memory and/or removable and non-removable media implemented in any type of technology for storage of information, such as computer-readable instructions, data structures, program modules, or other data. Such computer-readable media 704 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the inmate device 700, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 is used to store any number of functional components that are executable by the processors 702. In many implementations, these functional components comprise instructions or programs that are executable by the processors and that, when executed, specifically configure the one or more processors 702 to perform the actions attributed above to the inmate mobile devices (e.g., the first inmate mobile device 214, the second inmate mobile device 220, and the third inmate mobile device 222) and the employee devices 226. In addition, the computer-readable media 704 store data used for performing the operations described herein.

In the illustrated example, the functional components stored in the computer-readable media 704 include a location fencing application 712, a location module 714, a possession module 716, a biometric module 718, and a surveillance module 720.

The location fencing application locally manages the inmate device 700 within a location fencing system, such as the location fencing system 100 and the location fencing system 200. In some embodiments, the location fencing application 712 manages the sending of location information (e.g., the location information 264), presence alerts (e.g., the present alert 116), and possession information (e.g., the possession information 274). Further, the location fencing application 712 monitors the battery charge of the inmate device 700, and remains functional in low power modes of the inmate device 700. In some embodiments, the location fencing application 712 determines that the battery charge of the inmate device 700 is critically low, and triggers a low power mode of the inmate device 700. While in a lower power mode, the inmate device 700 may provide limited device functionality to a user of the inmate device 700, and continue to send location information (e.g., the location information 258), presence alerts (e.g., the presence alerts 116), and possession information (e.g., the possession information 274) to a location fencing server (e.g., location fencing server 228). For example, the inmate device may appear to power down to a user, and continue to send location information to a location fencing server. Additionally, the location fencing application 712 may locally perform the functions of the tracking module 238, the fencing module 248, and the path prediction module 250.

The location module 714 determines a location identifier of the inmate device 700. In some embodiments, the location module includes a GPS device, IPS device, or GLONASS device. In some embodiments, the possession module 716 locally performs functions of the possession module 244. The biometric module 718 captures and authenticates biometric information using components of the inmate device 700 (e.g., the microphone, the camera, etc.). For example, the biometric module 718 directs the microphone 708 and camera 710 to capture biometric samples from a user of the inmate device 700. Further, the biometric module 718 authenticates the captured biometric samples, or sends the authentication information to the location fencing server 228 for authentication. The surveillance module 720 receives the control information 272 from the location fencing server 228, and captures the surveillance information 270 using components of the inmate device 700 (e.g., the microphone 708, the camera 710, etc.)

Additional functional components stored in the computer-readable media 704 include an operating system 722 for controlling and managing various functions of the inmate device 700. The inmate device 700 also includes or maintains other functional components and data, such as other modules and data 724, which include programs, drivers, etc., and the data used or generated by the functional components. Further, the inmate device 700 includes many other logical, programmatic and physical components, of which those described above are merely examples that are related to the discussion herein.

The communication interface(s) 706 includes one or more interfaces and hardware components for enabling communication with various other devices, such as the location fencing server 228, the location fencing server 600, the employee devices 226, or other computing devices, over the network(s) 230. For example, communication interface(s) 706 facilitates communication through one or more of the Internet, cable networks, cellular networks, wireless networks (e.g., Wi-Fi, cellular) and wired networks. As several examples, the location fencing server 228 and the inmate device 700 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

FIG. 7 further illustrates that the inmate device 700 includes a display 726. Depending on the type of computing device used as the inmate device 700, the display 726 may employ any suitable display technology. For example, the display 726 may be a liquid crystal display, a light emitting diode display, or any other suitable type of display able to present digital content thereon. In some embodiments, the display 726 includes touch sensor with the display 726 to provide a touchscreen display configured to receive touch inputs for enabling interaction with a graphic interface presented on the display 726. Accordingly, implementations herein are not limited to any particular display technology. Alternatively, in some other embodiments, the inmate device 700 may not include a display 726.

Furthermore, the inmate device 700 is equipped with various input/output (I/O) devices 728. Such I/O devices 728 include a display, various user interface controls (e.g., buttons, joystick, keyboard, mouse, touch screen, etc.), audio speakers, connection ports, sensors (e.g., accelerometer, gyroscope, a compass, localization sensors, photometer, magnetometer, fingerprint sensors, etc.), and so forth. Additionally, the inmate device 700 includes various other components that are not shown, examples of which include removable storage, a power source, such as a battery and power control unit, and so forth.

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
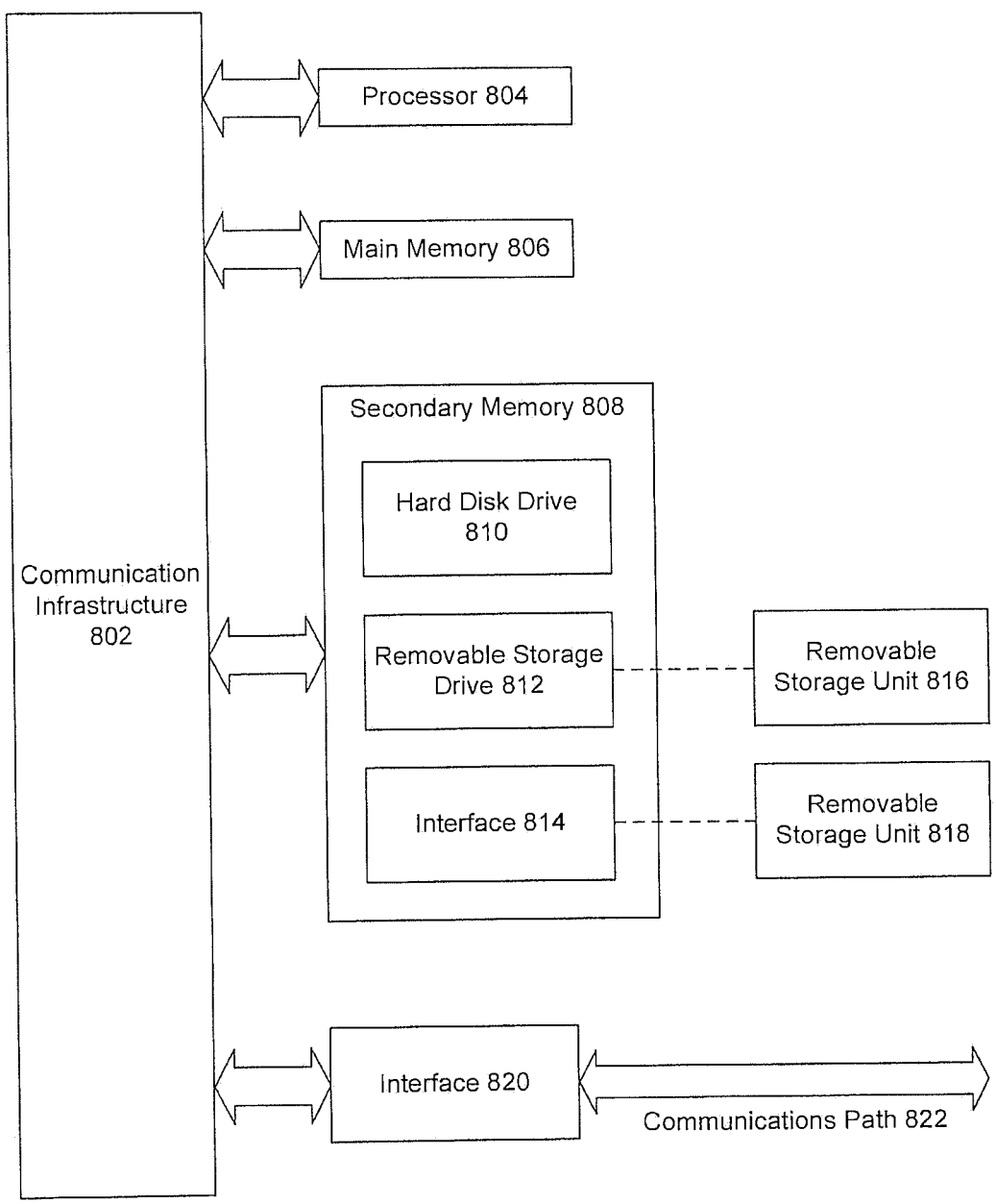
FIG. 8 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-5 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for displaying location fencing information within a controlled environment, comprising:
assigning an inmate device to an inmate, wherein the inmate is a first inmate;
receiving first location information from a first location beacon, the first location information indicating that the first location beacon has detected the inmate device within a proximity of the first location beacon;
receiving second location information from a second location beacon, the second location information indicating that the second location beacon has detected the inmate device within a proximity of the second location beacon;
determining a previous path of the inmate based on the first location information and the second location information;
generating a prediction model based upon historic location information associated with the inmate;
determining a predicted path of the inmate based on the prediction model;

determining a proximity policy associated with the inmate;
receiving a notification of inmate locations of the first inmate and a second inmate from a generated map of the controlled environment that displays the inmate locations of the first inmate and the second inmate within the controlled environment;
determining a potential violation of the proximity policy based on the predicted path, comprising:
  determining that the inmate location of the first inmate is not permitted to be within a predetermined distance of the inmate location of the second inmate; and
  determining that the predicted path is within the predetermined distance of the inmate location of the first inmate;
displaying a graphical user interface (GUI) including the previous path and the predicted path;
applying, within the GUI, a first graphical effect to the predicted path based on the potential violation, the first graphical effect distinguishing the predicted path from the previous path;
displaying, within the GUI, a selectable visual representation corresponding to the inmate and an employee, including the first graphical effect to the predicted path; and
receiving, via the GUI, a selection of the selectable visual representation, wherein the selection is for initiating a voice communication with the employee based on the potential violation of the proximity policy and for sending commands to the inmate device.

2. The method of claim 1, wherein determining the proximity policy comprises determining the proximity policy associated with the inmate based on at least one of incident information or affiliation information.

3. The method of claim 1, further comprising:
displaying, within the GUI, an inmate location of a second inmate; and
applying, within the GUI, a second graphical effect to the inmate location of the second inmate, wherein the second graphical effect is distinguished from the first graphical effect.

4. The method of claim 3, further comprising:
displaying, within the GUI, information about the second inmate based on the selection.

5. The method of claim 3, further comprising:
sending, to the second inmate device, a command based on the selection.

6. The method of claim 3, further comprising:
initiating a communication channel with the second inmate device based on the selection.

7. A non-transitory computer-readable device having instructions stored thereon that, when executed by at least one computing device, cause the at least one computing device to perform operations comprising:
assigning an inmate device to an inmate, wherein the inmate is a first inmate;
receiving first location information from a first location beacon, the first location information indicating that the first location beacon has detected the inmate device within a proximity of the first location beacon;
receiving second location information from a second location beacon, the second location information indicating that the second location beacon has detected the inmate device within a proximity of the second location beacon;
determining a previous path of the inmate based on the first location information and the second location information;
generating a prediction model based upon historic location information associated with the inmate;
determining a predicted path of the inmate based on the prediction model;
determining a proximity policy associated with the inmate;
receiving a notification of inmate locations of the first inmate and a second inmate from a generated map of a controlled environment that displays the inmate locations of the first inmate and the second inmate within the controlled environment;
determining a potential violation of the proximity policy based on the predicted path, comprising:
  determining that the inmate location of the first inmate is not permitted to be within a predetermined distance of the inmate location of the second inmate; and
  determining that the predicted path is within the predetermined distance of the inmate location of the first inmate;
displaying a graphical user interface (GUI) including the previous path and the predicted path;
applying, within the GUI, a first graphical effect to the predicted path based on the potential violation, the first graphical effect distinguishing the predicted path from the previous path;
displaying, within the GUI, a selectable visual representation corresponding to the inmate and an employee, including the first graphical effect to the predicted path; and
receiving, via the GUI, a selection of the selectable visual representation, wherein the selection is for initiating a voice communication with the employee based on the potential violation of the proximity policy and for sending commands to the inmate device.

8. The non-transitory computer-readable device of claim 7, wherein determining the proximity policy comprises determining the proximity policy associated with the inmate based on at least one of incident information or affiliation information.

9. The non-transitory computer-readable device of claim 7, further comprising:
displaying, within the GUI, an inmate location of a second inmate; and
applying, within the GUI, a second graphical effect to the inmate location of the second inmate, wherein the second graphical effect is distinguished from the first graphical effect.

10. The non-transitory computer-readable device of claim 9, the operations further comprising:
displaying, within the GUI, information about the second inmate based on the selection.

11. The non-transitory computer-readable device of claim 9, the operations further comprising:
sending, to the second inmate device, a command based on the selection.

12. The non-transitory computer-readable device of claim 9, the operations further comprising:
initiating a communication channel with the second inmate device based on the selection.

13. A location fencing system comprising:
an inmate device associated with an inmate located within a controlled environment; and
a location fencing device including one or more processors and/or circuits configured to:
assign an inmate device to the inmate, wherein the inmate is a first inmate;
determine a first location of the inmate device from a first location beacon, the first location indicating that the first location beacon has detected the inmate device within a proximity of the first location beacon;
determine a second location of the inmate device from a second location beacon, the second location indicating that the second location beacon has detected the inmate device within a proximity of the second location beacon;
determine a previous path of the inmate based on the first location and the second location;
generate a prediction model based upon historic location information associated with the inmate;
determine a predicted path of the inmate based on the prediction model;
determine a proximity policy associated with the inmate;
receive a notification of inmate locations of the first inmate and a second inmate from a generated map of the controlled environment that displays the inmate locations of the first inmate and the second inmate within the controlled environment;
determine a potential violation of the proximity policy based on the predicted path by:
determining that the inmate location of the first inmate is not permitted to be within a predetermined distance of the inmate location of the second inmate; and
determining that the predicted path is within the predetermined distance of the inmate location of the first inmate;
display a graphical user interface (GUI) including the previous path and the predicted path;
apply, within the GUI, a first graphical effect to the predicted path based on the potential violation, the first graphical effect distinguishing the predicted path from the previous path;
display, within the GUI, a selectable visual representation corresponding to the inmate and an employee, including the first graphical effect to the predicted path; and
receive, via the GUI, a selection of the selectable visual representation, wherein the selection is for initiating a voice communication with the employee based on the potential violation of the proximity policy and for sending commands to the inmate device.

14. The location fencing system of claim 13, wherein the one or more processors and/or circuits are further configured to determine that the inmate is in possession of the inmate device.

15. The location fencing system of claim 13, wherein the one or more processors and/or circuits are further configured to:
display, within the GUI, an inmate location of a second inmate; and
apply, within the GUI, a second graphical effect to the inmate location of the second inmate, wherein the second graphical effect is distinguished from the first graphical effect.

16. The location fencing system of claim 15, wherein the one or more processors and/or circuits are further configured to:
send, to the second inmate device, a command based on the selection.

17. The location fencing system of claim 15, wherein the one or more processors and/or circuits are further configured to:
display, within the GUI, information about the second inmate based on the selection.

* * * * *